United States Patent [19]

Haugrud

[11] 4,385,902
[45] May 31, 1983

[54] PROCESS FOR PURIFYING CRYSTALLINE POTASSIUM CHLORIDE

[75] Inventor: Brett G. Haugrud, Edmonton, Canada

[73] Assignee: PPG Industries Canada, Ltd., Edmonton, Canada

[21] Appl. No.: 162,562

[22] Filed: Jun. 24, 1980

Related U.S. Application Data

[63] Continuation-in-part of Ser. No. 858,866, Dec. 8, 1977, abandoned.

[51] Int. Cl.$^3$ .................. B01D 9/00; B01D 11/02; B01J 8/08
[52] U.S. Cl. ...................... 23/293 R; 23/299; 23/302 R; 423/658.5
[58] Field of Search ............. 23/299, 302 R, 293 R; 423/449, 208, 658.5; 71/63

[56] References Cited

U.S. PATENT DOCUMENTS

| | | |
|---|---|---|
| 681,407 | 8/1901 | Coward . |
| 1,216,187 | 2/1917 | Trump . |
| 1,436,228 | 11/1922 | Bassett . |
| 1,751,740 | 3/1930 | Jeremiassen . |
| 2,329,505 | 9/1943 | Zimmermann . |
| 2,699,379 | 1/1955 | Luque . |
| 2,703,272 | 3/1955 | Fughsman . |
| 3,026,194 | 3/1962 | Smith et al. . |
| 3,309,177 | 3/1967 | Goerg .................. 422/279 |
| 3,352,633 | 11/1967 | Nylander . |
| 3,390,402 | 6/1968 | Goerg . |
| 3,642,454 | 2/1972 | Nylander ............ 23/302 R |
| 3,644,102 | 2/1972 | Svanoe . |
| 3,697,234 | 10/1972 | Bonilla . |

FOREIGN PATENT DOCUMENTS

| | | |
|---|---|---|
| 974732 | 9/1975 | Canada .................. 23/170 |
| 235751 | 6/1911 | Fed. Rep. of Germany . |
| 248462 | 6/1912 | Fed. Rep. of Germany . |
| 282952 | 3/1915 | Fed. Rep. of Germany . |
| 872200 | 3/1953 | Fed. Rep. of Germany ........ 12/4 |
| 1059418 | 6/1959 | Fed. Rep. of Germany . |
| 497577 | 9/1919 | France . |
| 1226060 | 2/1960 | France . |
| 213531 | 12/1923 | United Kingdom . |
| 220271 | 3/1925 | United Kingdom . |
| 721981 | 1/1955 | United Kingdom . |

OTHER PUBLICATIONS

F. Serowy, Verarbeitungsmethoden der Kalirohsalze, Halle, 1952, pp. 89–93.
Handbuch der Kali–Industrie, Braunschweig 1887, pp. 204–211, E. Pfeiffer.
Chemische Technologie, Winnacker–Weingartner, 3rd Edition (1970), vol. 1, p. 127.
Frieberger Forschungshefte A267, "Chemie and Technologie der Kalisalze," Gotthard Spiegel, pp. 292–297 (International Symposium, Oct. 17–20, 1961).
Gmelins Handbuck Der Anorganischen Chemie, Potassium, Cleansing of Potassium Chloride, 1938, K1271–K1272.
Gmelins Handbuch Der Anorganischen Chemie, Potassium, The System NaCl–KCl–H$_2$O, 1942, pp. 18–19.

*Primary Examiner*—Bradley Garris
*Attorney, Agent, or Firm*—Irwin M. Stein

[57] ABSTRACT

Industrially crystallized potassium chloride having a potassium chloride content of at least 95 weight percent and containing a minor contaminating amount of inorganic metal salt impurities, e.g., sodium chloride, is purified by leaching compacted particles of said potassium chloride with an aqueous leaching solution, the solute of which solution is selected from the group consisting of potassium chloride and mixtures of potassium chloride and sodium chloride. The leaching solution is saturated with respect to potassium chloride and substantially unsaturated with respect to sodium chloride. The compacted particles are maintained in contact with the leaching solution for a time sufficient to reduce substantially the sodium chloride content thereof, and potassium chloride particles of reduced sodium chloride content are recovered from the leaching solution. The leached compacted particles are transparent and comprise single and compound euhedral cubic crystals.

22 Claims, No Drawings

PROCESS FOR PURIFYING CRYSTALLINE POTASSIUM CHLORIDE

CROSS REFERENCE TO RELATED APPLICATIONS

This application is a continuation-in-part application of my copending application, Ser. No. 858,866, filed Dec. 8, 1977 of the same title, now abandoned.

DESCRIPTION OF THE INVENTION

The present invention relates to purifying industrially crystallized potassium chloride. More particularly, the present invention relates to leaching from such potassium chloride inorganic metal salt impurities present in contaminating amounts therein; and, still more particularly, relates to leaching sodium chloride from compacted particles of industrially crystallized potassium chloride.

Typically, potassium chloride is obtained from ores that contain potassium chloride as well as other alkali and alkaline earth metal salts such as sodium chloride, calcium chloride, magnesium sulfate, sodium carbonate, magnesium chloride, etc., in varying proportions. Other soluble and insoluble substances may also be present in varying proportions in the ore. The potassium chloride is separated from the other metal salts and other impurities in the ore by conventional mining operations which include: froth flotation, fractional leaching, selective precipitation, solution mining, as well as other processes.

In, for example, the froth flotation process, ground potassium chloride-containing ore is mixed with a solution saturated with respect to the ore constituents so that upon addition of collection, conditioning, levitation, frothing, etc. agents, the other impurities and other inorganic metal salts are separated from the potassium chloride or, vice versa. The resulting potassium chloride particles typically contain high levels of metal salt impurities (about 2-5 percent by weight), which are probably due to the impurities being incorporated, encapsulated, or occluded within the particles during the geological time frame of natural crystal formation. These particles often have a reddish discoloration due to traces of iron and are thought to have a characteristically unique distribution of metal salt impurities throughout the particle.

Industrially formed potassium chloride is produced by most of the other mentioned mining operations. As used in the specification and claims, the term "industrially formed" is intended to mean and include potassium chloride that has been crystallized out of a solution rich in both sodium chloride and potassium chloride by an industrial process. This is to be distinguished from the formation of crystals in a geological time frame. One such industrial process is the fractional leaching process in which a potassium chloride containing ore is contacted with a leaching solution which becomes enriched in potassium chloride. Subsequently the potassium chloride is crystallized out of the leaching solution. Another such industrial process is the selective precipitation process wherein a chemical is added to a potassium chloride-containing salt solution to precipitate only the potassium chloride, which is subsequently removed from the solution. Still another such industrial process is solution mining, wherein a solvent, e.g. water, is brought into contact with a potassium chloride-containing ore deposit. The resulting solution is withdrawn and the dissolved potassium chloride is recovered by crystallization.

The aforesaid industrial processes involve a step in which potassium chloride is crystallized out of or separated from a solution that is rich in sodium chloride and contains other inorganic metal salt impurities. By "being rich in sodium chloride" is meant that sufficient sodium chloride is present in the mother liquor such that potassium chloride crystallized from the mother liquor can contain up to 2.5 weight percent sodium chloride. Upon formation of the potassium chloride crystals within this mother liquor, sodium chloride and other salts present in the mother liquor are unavoidably incorporated, encapsulated, or occluded within the crystal.

It has been recognized that processes used to produce salts such as sodium chloride and potassium chloride produce a product that typically contains impurities in significant amounts. For example, U.S. Pat. No. 681,407 describes an improved process for producing sodium chloride from sea water wherein precipitated salt from the crystallizing ponds is washed with a near saturated solution of salt (25° Baume) to wash out mud and other foreign substances. Recrystallization as a means of purification is described in U.S. Pat. No. 3,239,505. There, a repulped slurry of a potassium chloride concentrate containing about 3 percent soluble impurities consisting chiefly of sodium chloride is heated to boiling in a closed vessel and then cooled. The potassium chloride crystallizing from the solution is purified and is reported to contain about one percent (1%) by weight of impurities. Similarly, in U.S. Pat. No. 3,352,633, potassium chloride fines produced by the flotation of an ore and containing in excess of 2 weight percent sulfate salts is repulped with a saturated potassium chloride brine that is unsaturated with sulfate salts and contains a magnesium ion content of at least 2 weight percent. The repulped fines are dissolved in a hot aqueous liquid, which is subsequently cooled to recrystallize a purified product.

Potassium chloride containing minor contaminating amounts of inorganic metal salt impurities, principally sodium chloride, is useful as a fertilizer. However, certain commercial uses of potassium chloride, e.g. in safety appliances, pharmaceutical or reagent use, and for the manufacture of chemically pure potassium hydroxide, require a substantially purer grade of potassium chloride. It is contemplated that the purer grade should contain less than 0.5 weight percent inorganic metal salt, e.g. sodium chloride, impurities.

It has now been found that industrially crystallized potassium chloride containing at least 95, e.g., 96 or 97.5, weight percent potassium chloride and a minor contaminating amount of other inorganic metal salts, e.g., sodium chloride, can be treated to reduce to lower levels the other inorganic metal salt content thereof by a simple and economical process. In that process, solid crystalline potassium chloride containing a minor contaminating amount of sodium chloride is contacted with an aqueous leaching solution, the solute of which is selected from the group consisting of potassium chloride and mixtures of potassium chloride and sodium chloride, for a time sufficient to reduce substantially the sodium chloride content thereof. The liquid leaching solution is saturated with respect to potassium chloride and, when present, substantially unsaturated with respect to sodium chloride and other inorganic metal salts that may be present in the potassium chloride. Since the leaching solution is saturated with respect to potassium chloride, the process does not involve the bulk dissolving and recrystallization of potassium chloride. It has also been found that the level of contaminating metal salts other than sodium chloride present as impurities in the potassium chloride are reduced as an added benefit of the process.

DETAILED DESCRIPTION OF THE INVENTION

Potassium chloride is obtained commonly from ores containing potassium chloride, sodium chloride, magnesium and calcium salts, other inorganic metal salts in varying proportions and smaller amounts of other soluble and insoluble matter. Industrially formed potassium chloride is crystallized from solutions containing such inorganic metal salts, and particularly from solutions rich in both sodium chloride and potassium chloride. Since the inorganic metal salts present in the ore along with potassium chloride are not totally removed during processing, they are present in the solution (mother liquor) from which the potassium chloride is crystallized. Consequently, such metal salts are incorporated, encapsulated, or occluded with the potassium chloride crystal, thereby yielding potassium chloride particles containing a minor contaminating level of inorganic metal salt impurities. By potassium "particles" is meant that crystalline body formed by the solidification of potassium chloride having a regularly repeating internal arrangement of its atoms, including the product formed by consolidating solid potassium chloride by high pressure, in which case the internal arrangement of the potassium chloride may be distorted.

The minor amount of contaminating inorganic metal salt impurities can vary. Typically, the potassium chloride product is at least about 95, e.g., 96 or 97.5, weight percent potassium chloride. Thus, the metal salt impurities can represent about 5 weight percent or less of the potassium chloride product. Generally, the metal salt impurity level will range from about 0.5 to about 2.5 weight percent, e.g., about 0.9 to about 2 weight percent. As the principal metal salt impurity in industrially crystallized potassium chloride is by far sodium chloride, references hereinafter to sodium chloride as an impurity and the level of sodium chloride impurity in the potassium chloride are intended to include the other inorganic metal salts that are present in significantly smaller quantities than sodium chloride.

The process of the present invention is effective for reducing the sodium chloride impurity level of industrially formed potassium chloride as contrasted to potassium chloride produced by froth flotation. It is believed that the presence of trace amounts of iron and the unique distribution of metal salt impurities in potassium chloride produced by froth flotation, result in the process of the present invention being less effective with regard to such a product. It is preferred that industrially formed potassium chloride be treated by the method of this invention before it has been conditioned or treated in a manner that seals the surface of the particles. For example, treatment of dry potassium chloride with small amounts of water to reduce dusting and improve particle competency renders the process of the present invention less effective. Similarly, true single crystals of potassium chloride should be treated in accordance with the process of the present invention soon after the crystals are produced as evaporation of the mother liquor tends to seal the surface of the crystal. The potassium chloride need not be dried before treatment. Thus, it is contemplated that a slurry of newly formed potassium chloride be treated by the process of the present invention.

According to the present invention, industrially crystallized potassium chloride particles are contacted with an aqueous liquid leaching solution. This aqueous solution is one that can be percolated through a body of potassium chloride particles and is saturated with respect to potassium chloride. By "saturated" with respect to potassium chloride is meant that sufficient potassium chloride is in solution so that little, if any, of the potassium chloride particles treated will be dissolved as a consequence of being treated by the process of the invention.

The leaching solution can also contain sodium chloride, which is to be removed from the potassium chloride particles during the purification process; but, preferably, the leaching solution should be substantially unsaturated with respect to sodium chloride, i.e., contain less than 45, more preferably less than 25, grams of sodium chloride per liter of solution. While the rate at which sodium chloride is leached from the particles is altered when small amounts of sodium chloride are present in the leaching liquor (as compared to when no sodium chloride is present), the amount of sodium chloride leached is not changed significantly. For example, leaching of sodium chloride is virtually unchanged by sodium chloride concentrations in the leaching liquor of from 0 to 10 grams of sodium chloride per liter of solution. With solutions containing 20 grams sodium chloride per liter of solution, slightly less sodium chloride is leached in a given time, e.g., about 0.05 percent less sodium chloride by weight of the particles is leached after 16 hours than is leached with a 0 to 10 gram chloride per liter solution under the same conditions. Most preferably, the leaching solution initially contains no sodium chloride. However, persons skilled in the art will be able to easily ascertain what is a tolerable level of sodium chloride in the leaching solution throughout the leaching process. For best results, the sodium chloride level in the leaching liquor should be less than 25 grams of sodium chloride per liter of leaching liquor and, more preferably, the sodium chloride level should be less than 15 grams of sodium chloride per liter of liquor so as to provide a substantial driving force for removal of the sodium chloride from the potassium chloride particles.

Several methods are known in the art for contacting a liquid leaching solution with a solid. In practicing the process of the present invention, it is preferred that the potassium chloride particles be contacted with the leaching solution in a manner to achieve intimate contact of the particles with the leaching solution, i.e., sufficient leaching solution is used so that the entire surface area of each particle is contacted with the liquid leaching solution for a time sufficient to reduce the sodium chloride impurity level thereof. A ratio of 4000 grams of potassium chloride particles introduced to the system used for leaching per liter of leaching solution has been found to be adequate. Variations in the ratio, such as down to 200 or 300 grams of potassium chloride particles per liter of leaching solution, would not significantly improve results. Thus, a ratio of from about 300 to about 4000 grams of potassium chloride particles per liter of aqueous leaching solution can be used. Ratios of from about 200 to about 700 grams of potassium chloride per liter of solution are particularly useful for batch treatment of potassium chloride where the leaching liquor is not replaced continuously. Lower ratios can be used also; but, are economically unattractive since it would involve the movement of large quantities of liquid per unit weight of potassium chloride particles treated.

The potassium chloride particles treated can be agitated within the liquid leaching solution. However, the agitation should not be so vigorous that the potassium chloride particles are broken into fines, which are undesirable for certain applications of the purified potassium chloride product. Particular caution should be exercised if agitation is used since the leaching process itself reduces slightly the particle size. The extent of reduction in particle size depends on the size of the original particle. For example, particles having an original size distribution of −14, +28 Tyler mesh with a contaminating level of 0.65 weight percent sodium chloride were reduced to 0.32 percent sodium chloride after 16 hours of leaching. The treated product had a sieve analysis of +20 mesh, 40.2 percent; −20, +35 mesh, 44.9 percent; and −35 mesh, 14.8 percent. In a further example, particles with an original size distribution of −20, +28 Tyler mesh with a contaminating level of 1.10 weight percent sodium chloride were reduced to 0.21 percent sodium chloride after 16 hours of leaching. The treated product had a sieve analysis of +28 mesh, 98.4 percent; −28, +48 mesh, 1.2 percent; and −48 mesh, 0.3 percent.

Accordingly, the process of the present invention can be practiced using a vessel that is equipped with a stirrer or paddle, such that the stirrer or paddle agitates the solution containing the crystalline potassium chloride particles sufficiently to keep the particles suspended within the solution. The invention can also be practiced using a vessel in which a bed of potassium chloride is fluidized in the liquid leaching solution by a countercurrent influent stream of the liquid leaching solution or by some other fluid. The bed can also be settled or static. The mode of practice can be batch, multistaged or continuous using one vessel or column or a series of vessels or columns, and a portion of the purified product can come from each of the series of vessels or columns. Further, the staged manner of treatment can be employed using a continuous belt filter.

The process of the present invention can be practiced by feeding an aqueous slurry of potassium chloride or dried particulate potassium chloride to the leaching vessel(s). In the latter embodiment, it is contemplated that the particulate potassium chloride is introduced into a leaching vessel, e.g., column, containing a bed of the particulate potassium chloride within an aqueous solution saturated with respect to potassium chloride and substantially unsaturated with respect to sodium chloride. Leached particles of potassium chloride are withdrawn from the bottom of the leaching vessel (thereby providing a downward flow of the potassium chloride particles), dewatered, e.g., by filtration, and the aqueous solution so recovered recycled to the bottom of the vessel to provide a source of leaching solution. A purge stream can be taken from the top of the leaching vessel and make-up solution added to the recycle stream to the bottom of the vessel or used to wash the dewatered leached product.

The potassium chloride particles to be treated are contacted with the liquid leaching solution for a time sufficient to reduce substantially the sodium chloride content thereof. The time required can vary depending on the conditions used. Typically the sodium chloride content of the potassium chloride particles decreases quite rapidly during the first four hours of intimate contact (about 70 percent of the contaminant is leached). Thereafter, the sodium chloride content decreases at a slower rate (about 20 percent in the next 12 hours). Accordingly, the time during which leaching is conducted can vary from about 0.5 or 1 to about 18 or 24 hours, e.g., 0.5 to 4 hours. Preferably, the particles are contacted with the leaching solution for at least about 4, e.g., 6, hours.

It has been found that when practicing this invention at 23° C., without the aid of the above described rate-increasing factors, 30 minutes to 24 hours (preferably 30 minutes to 6 hours for compacted solids), contact time will substantially reduce the sodium chloride content of the potassium chloride particles. By "substantially reducing" the sodium chloride content of the potassium chloride particles is meant that the sodium chloride content is reduced from an initial high range of about 0.9 to 4, e.g., 0.9 to 2.5, percent by weight to a range of less than about 0.9 percent by weight. When the initial sodium chloride content of the potassium chloride particles is in the low range of from about 0.5 to 0.9 percent by weight, it is reduced to a range of less than about 0.5 percent by weight. For example, when the liquid leaching solution contained less than 25 grams of sodium chloride per liter of liquid leaching solution throughout the treatment, potassium chloride particles contaminated with about 1.0 percent sodium chloride by weight and having a size distribution of −16, +20 Tyler mesh were reduced to 0.30 percent by weight sodium chloride after leaching for 6 hours at 23° C. In another example, potassium chloride particles contaminated with 0.6 percent sodium chloride by weight and having a size distribution of −16, +20 Tyler mesh were reduced to 0.2 percent sodium chloride after leaching under the same conditions. The rate at which the sodium chloride content will be reduced will be less when the liquid leaching solution contains greater amounts of sodium chloride. The leaching will not stop completely, however, until the liquid leaching solution becomes near 100 percent saturation with sodium chloride—although the rate at which leaching occurs may become very low.

Initial particle size also influences the leaching rate. Larger non-compacted particles will be leached at a faster rate than smaller non-compacted particles. Smaller compacted particles are leached at a faster rate than any potassium chloride particles and all compacted particles are leached at a faster rate than non-compacted particles. Thus, the process of the present invention is particularly applicable to compacted industrially crystallized potassium chloride. Compaction of potassium chloride, e.g., potassium chloride fines, is a technique well known in the art. Briefly, the process comprises passing particulate potassium chloride between two rolls maintained under compression to form a compacted sheet. The compacted sheet is subsequently crushed and the resulting particles sized with conventional screens.

While elevated temperatures are not necessary for the practice of this invention, an elevated temperature may reduce the time necessary to substantially reduce the sodium chloride contaminant content. For example, by raising the temperature of the treatment from 23° C. to 60° C., an additional 0.02 to 0.1 percent (by weight of the particles) of sodium chloride is removed, depending on the initial particle size. Pressure should not have a material effect on the amount of sodium chloride removed, since the process of this invention involves a liquid system.

Leaching the contaminating metal salts from potassium chloride can be carried out isothermally at a wide range of temperatures. By "isothermal" is meant that there is no intentional removal or addition of heat to the leaching system at the temperatures employed in the leaching system. Generally, leaching is more effective at higher temperatures. However, as the leaching temperature increases, other disadvantageous factors become determinative. Operating at the boiling temperature of the solution would vaporize the leaching solution and make it more saturated with respect to the contaminant metal salt impurity. Further, higher temperatures require more potassium chloride to saturate the leaching solution and heating the leaching solution (especially under pressure) during treatment for the times according to this invention can bring adverse economics to bear. With these disadvantages as factors and since the leaching should be carried out above the freezing point of the leaching solution, it is contemplated that the leaching be carried out between 0° C. and 90° C., preferably between 10° C. or 20° C. and 70° C.

After leaching, purified potassium chloride particles substantially reduced in sodium chloride content are separated from the leaching solution and dried. There are many conventional methods and separating means known in the art for separating solid particles from a liquid phase. Such methods include filtering, centrifuging, and decanting. Any economic centrifuging apparatus that can adequately separate the particles from the aqueous leaching solution or aqueous phase containing the purified particles can be used. A cyclone centrifuging apparatus is one which is commonly known in the trade. The cyclone can be designed to provide the centrifugal force to permit extraction of the maximum particle size desired. Higher centrifugal forces remove all size particles while a lower centrifugal force removes only larger size particles. With that being the case, larger and smaller particles can be separated so the larger potassium chloride particles can be used for the product while smaller less desirable particles can be used to saturate a replenishing liquid leaching solution. Preferably, separating apparatus that permits washing of the separated particles is used.

The leached potassium chloride particles produced by the process of the present invention, e.g., leached compacted particles of industrially crystallized potassium chloride, are typically at least 99.5 weight percent potassium chloride. Generally, the leached particles are from about 99.5 to about 99.9 weight percent, e.g., from about 99.7 to about 99.8 weight percent potassium chloride. The remaining constituents of the particles are those ingredients normally found in potassium chloride recovered from ores containing same, e.g., salts such as chlorides and sulfates of sodium, magnesium and calcium, other elements found in the ore, e.g., bromine, and insoluble materials.

The largest remaining salt constituent in the leached potassium chloride is sodium chloride, which is present in amounts typically ranging from about 0.03 to about 0.3 weight percent. More typically, the sodium chloride is present in amounts of from about 0.1 to about 0.25 weight percent.

The leached compacted potassium chloride particles are transparent, have good crystal morphology, i.e., the particles are composed of well-defined single and compound cubic crystals. Consequently, the crystals can be designated as euhedral, i.e., they have a well-formed crystal habit. The leached compacted particles also are free-flowing and are harder than unleached particles as demonstrated by their greater resistance to breakage or degradation as a result of handling. Further, the leached compacted particles are more resistant to caking in storage, particularly bulk storage, compared to the unleached particles. The leached compacted particles typically exhibit an Instantaneous Yield Locus of less than 1 kilogram, more usually less than 0.5, e.g., 0.1, kilogram. In contrast, compacted unleached potassium chloride particles are opaque, without well defined external crystal morphology and are not free flowing.

The present process is more particularly described in the following examples which are intended as illustrative only since numerous modifications and variations therein will be apparent to those skilled in the art.

EXAMPLE I

Samples of solution mined and industrially crystallized potassium chloride containing sodium chloride, calcium and magnesium salts, and bromine as contaminants were obtained from both the solid discharge of a horizontal filter and a fluid bed dryer, and separated into various size fractions. The horizontal filter sample was dried at room temperature before separation into size fractions. Each of the fractions was slurried for 24 hours without stirring with an aqueous leaching solution saturated with potassium chloride in the proportion of 200 grams of particulate potassium chloride per liter of saturated potassium chloride solution. The saturated potassium chloride leaching solution contained less than 20 grams of the aforesaid contaminant metal salts per liter of leaching solution throughout the leaching process. There was no replacement of the leaching liquor. All leaching was done at room temperature (23° C.). The leached samples were then vacuum filtered, dried at about 110° C., and analyzed for contaminant metal salts and bromine. The results as shown in Tables I–IV below. The data of those Tables show that, in each case, sodium chloride and other metal salt impurity levels in the samples were reduced substantially. Generally, the larger mesh fractions were reduced to lower metal salt impurity levels than the smaller mesh fractions. The bromine content of the crystals was also reduced.

TABLE I

SODIUM CHLORIDE CONTENT IN LEACHED AND UNLEACHED PRODUCT

| Sample Retained on Tyler Mesh | Sodium Chloride (wt. percent) | | | |
|---|---|---|---|---|
| | Horizontal Filter Product | | Fluid Bed Dryer Product | |
| | Unleached | Leached | Unleached | Leached |
| 8 | 1.06 | 0.26 | 1.03 | 0.23 |
| 10 | 1.05 | 0.23 | 1.03 | 0.22 |
| 14 | 1.01 | 0.25 | 1.06 | 0.24 |
| 16 | 0.99 | 0.27 | 1.07 | 0.28 |
| 20 | 0.93 | 0.29 | 1.02 | 0.30 |
| 28 | 0.80 | 0.31 | 0.79 | 0.33 |
| 35 | 0.78 | 0.40 | 0.83 | 0.39 |
| 48 | 0.75 | 0.44 | 0.93 | 0.41 |
| 65 | 0.76 | 0.45 | 1.03 | 0.40 |
| 80 | 0.80 | 0.44 | 1.15 | 0.40 |
| 100 | 0.85 | 0.45 | 1.24 | 0.37 |

TABLE II

CALCIUM CONTENT IN LEACHED AND UNLEACHED PRODUCT

| Sample Retained on Tyler Mesh | Calcium (ppm) | | | |
|---|---|---|---|---|
| | Horizontal Filter Product | | Fluid Bed Dryer Product | |
| | Unleached | Leached | Unleached | Leached |
| 8 | 60 | 10 | 110 | 10 |
| 10 | 185 | 10 | 116 | 16 |
| 14 | 150 | 10 | 190 | 21 |
| 16 | 150 | 10 | 221 | 32 |
| 20 | 210 | 10 | 216 | 37 |
| 28 | 145 | 10 | 165 | 47 |
| 35 | 120 | 20 | 135 | 90 |
| 48 | 115 | 25 | 160 | 58 |
| 65 | 135 | 35 | 195 | 58 |
| 80 | 150 | 45 | 215 | 63 |
| 100 | 165 | 60 | 240 | 68 |

TABLE III

MAGNESIUM CONTENT IN LEACHED AND UNLEACHED PRODUCT

| Sample Retained on Tyler Mesh | Magnesium (ppm) | | | |
|---|---|---|---|---|
| | Horizontal Filter Product | | Fluid Bed Dryer Product | |
| | Unleached | Leached | Unleached | Leached |
| 8 | 80 | 15 | 133 | 10 |
| 10 | 225 | 10 | 152 | 10 |
| 14 | 250 | 15 | 214 | 14 |
| 16 | 240 | 10 | 257 | 24 |
| 20 | 285 | 15 | 248 | 29 |
| 28 | 175 | 20 | 180 | 33 |
| 35 | 150 | 20 | 200 | 33 |
| 48 | 120 | 20 | 235 | 33 |
| 65 | 125 | 20 | 290 | 26 |
| 80 | 130 | 20 | 300 | 24 |
| 100 | 150 | 20 | 330 | 24 |

TABLE IV

BROMINE CONTENT IN LEACHED AND UNLEACHED PRODUCT

| Tyler Mesh Size Sample | Bromine (percent) | | | |
|---|---|---|---|---|
| | −6, +8 | −10, +14 | −20, +28 | −48, +65 |
| Horizontal filter, unleached | 0.05 | 0.05 | 0.05 | 0.05 |
| Horizontal filter, leached | 0.03 | 0.03 | 0.03 | 0.04 |
| Fluid bed dryer, unleached | 0.05 | — | 0.05 | 0.05 |
| Fluid bed dryer, leached | 0.03 | — | 0.035 | 0.04 |

EXAMPLE II

A sample of potassium chloride obtained from the horizontal filter discharge was treated as in Example I except the sample initially had a sodium chloride content of 0.68 percent by weight. The sample was separated into two fractions. One fraction was leached at 23° C.; the other fraction was leached at 60° C. Both fractions were stirred during leaching. The leached samples were dried and analyzed for sodium chloride. The results are shown in Table V below. It can be seen that universally better results were obtained at the higher temperature for the various contact times.

TABLE V

LEACHING AT 60° C. COMPARED TO LEACHING AT 23° C. AT DIFFERENT CONTACT TIMES

| Contact Time (hrs.) | Percent Sodium Chloride | |
|---|---|---|
| | 23° C. | 60° C. |
| 0 | .68 | .68 |
| 2 | .51 | .45 |
| 4 | .39 | .31 |
| 6 | .32 | .28 |
| 8 | .32 | .26 |
| 10 | .31 | .24 |
| 12 | .31 | .23 |
| 14 | .31 | .21 |
| 16 | .30 | .20 |

EXAMPLE III

A sample of solution mined and industrially crystallized compacted potassium chloride, i.e., potassium chloride fines compacted to a solid cake and subsequently crushed to a size ranging from 10 to 200 Tyler mesh, i.e., −8, +200 mesh, was leached as in Example I. The sample had an initial sodium chloride content of 0.97 percent by weight. The sample was separated into two parts. One part was leached at 23° C. The other part was leached at 60° C. Both parts were stirred during leaching. The leached samples were dried at room temperature and then analyzed for sodium chloride. The results are shown in Table VI. It can be seen from the results that industrially crystallized compacted potassium chloride is leached to very low values of sodium chloride content, e.g., near 0.1 percent sodium chloride content by weight.

TABLE VI

LEACHING COMPACTED SOLID KCl AT 60° C. COMPARED TO LEACHING AT 23° C. AT DIFFERENT CONTACT TIMES

| Contact Time (hrs.) | Percent Sodium Chloride | |
|---|---|---|
| | 23° C. | 60° C. |
| 0 | .97 | .97 |
| .5 | .36 | .30 |
| 1 | .25 | .16 |
| 2 | .20 | .15 |
| 3 | .19 | .14 |
| 4 | .18 | .135 |
| 5 | .17 | .13 |
| 6 | .165 | .13 |

EXAMPLE IV

Industrially crystallized, compacted dry potassium chloride particles were charged to a 2¾ inch I.D. plexiglass column containing a perforated plate at the bottom to dispense the elutriant (leaching liquor). The bed height was adjusted to obtain a value of 6:1 for the bed height/bed diameter ratio under conditions of no elutriant flow. A saturated potassium chloride leaching liquor containing a low level of sodium chloride was pumped to the bottom of the column and the liquid column overflow forwarded to a holding tank, which acted as a source for the leaching solution. The leaching was conducted at room temperature and the flow of leaching liquor upward through the bed was insufficient to cause expansion of the bed, i.e., there was no overall movement of the solids in dual, undersized particles. This procedure was used to perform leaching for one, two and four hours duration in three separate runs and the leached samples analyzed for sodium chloride, calcium and magnesium and, tested for its tendency to cake. The conditions used and the results obtained are tabulated in Table VII.

The test used to indicate the tendency of the dried leached samples to cake was the Instantaneous Yield Locus test (J & J Caking Test). In this test, a short cylinder having two rings at its top (the uppermost ring being movable) is filled with the sample to be tested. The sample is uniformly consolidated in the cylinder by the application of a compressive force and a 15 kilogram weight applied to the top of the sample for three days. At the end of that period, a shearing force is applied to the top ring along a horizontal line and the force required to break the bond between the two rings is measured. The higher the force value, the stronger the bond formed between the particles of the sample and hence the greater the tendency to cake.

TABLE VII

| | ONE-STAGE LEACHING | | | |
|---|---|---|---|---|
| RUN # | 1 | 2 | 3 | UN-LEACHED |
| Initial Particle Size (Tyler mesh) | +35 | +35 | +35 | +35 |
| Leaching Time (min) | 60 | 120 | 240 | — |
| Bed Type | Settled | Settled | Settled | — |
| Ratio Solids/Liquid | 0.35 | 0.35 | 0.35 | |
| Wt. % NaCl | 0.20 | 0.18 | 0.14 | 0.91 |
| Wt. % Ca | 0.0050 | 0.0043 | 0.0038 | 0.020 |
| Wt. % Mg | 0.0023 | 0.0023 | 0.0018 | 0.0015 |
| Leaching Solution Flow Rate (ml/sec) | 17.2 | 15.7 | 17.1 | |
| NaCl in Solution gpl | 2.98 | 3.27 | 2.33 | |
| J & J Caking Test Kg | <0.1 | <0.1 | <0.1 | 5.3 |

EXAMPLE V

The procedure of Example IV was repeated for five samples of compacted potassium chloride except that the leaching was conducted in two stages for a total leaching time of two hours. During the first stage, the leaching process was performed as described in Example IV for the time period used in that stage. Thereafter, the column was drained of liquid without removing the solids and the leaching process restarted using leaching solution from a second holding tank. The conditions used for the tests and the results are tabulated in Table VIII.

TABLE VIII

| | TWO-STAGE LEACHING | | | | |
|---|---|---|---|---|---|
| RUN # | 1 | 2 | 3 | 4 | 5 |
| Initial Particle Size (Tyler mesh) | +35 | +35 | +35 | +35 | +35 |
| Leaching Time, Stage 1 (min) | 5 | 15 | 60 | 105 | 115 |
| Leaching Time, Stage 2 (min) | 115 | 105 | 60 | 15 | 5 |
| Bed Type | Settled | Settled | Settled | Settled | Settled |
| Ratio Solids/Liquid | 0.35 | 0.35 | 0.35 | 0.35 | 0.35 |
| Wt. % NaCl | 0.16 | 0.17 | 0.17 | 0.16 | 0.17 |
| Wt. % Ca | 0.0048 | 0.0040 | 0.0045 | 0.0045 | 0.0036 |
| Wt. % Mg | 0.0018 | 0.0018 | 0.0018 | 0.0018 | 0.0016 |
| Leaching Solution, Flow, rate, ml/sec | 19.1 | 19.5 | 19.2 | 13.1 | 13.3 |
| NaCl in Solution, 1st Stage, gpl | 1.75 | 2.08 | 2.89 | 3.16 | 2.98 |
| NaCl in Solution 2nd Stage gpl | 1.48 | 1.09 | 0.62 | 0.46 | 0.41 |
| J & J Caking Test(Kg) | 0.6 | 0.4 | <0.1 | 1.0 | <0.1 |

The data of Tables VII and VIII show that compacted industrially crystallized potassium chloride can be purified to low levels of sodium chloride, i.e., from 0.91 weight percent to less than 0.20 weight percent, by the leaching process of the present invention. The caking test also indicates that such leached materials are more resistant to caking than the unleached material.

Although the present process has been described with reference to specific details of certain embodiments thereof, it is not intended that such details be regarded as limitations upon the scope of the invention except as and to the extent that those details are included in the accompanying claims.

I claim:

1. A method of reducing the sodium chloride content of an industrially crystallized potassium chloride product having a potassium chloride content of at least 96 weight percent and containing a minor contaminating amount of sodium chloride, which comprises leaching under isothermal conditions compacted particles of a particle size from about 8 to 200 Tyler mesh of said potassium chloride product with an aqueous leaching solution, the solute of which solution is selected from the group consisting of potassium chloride and mixtures of potassium chloride and sodium chloride, said leaching solution being saturated with respect to potassium chloride and containing less than 45 grams of sodium chloride per liter of solution, for a time sufficient to reduce substantially the sodium chloride content of the compacted particles and separating leached particulate potassium chloride product having a sodium chloride content of less than about 0.5 weight percent from the leaching solution.

2. The method of claim 1 wherein the potassium chloride content of the industrially crystallized potassium chloride product is at least 97.5 weight percent.

3. The method of claims 1 or 2 wherein the compacted potassium chloride crystals are leached for from about 1 to 24 hours.

4. The method of claims 1 or 2 wherein the compacted potassium chloride particles are leached at temperatures of between 20° C. and 70° C.

5. The method of claims 1 or 2 wherein the contaminating amount of sodium chloride is from 0.5 to 2.5 percent by weight of the potassium chloride product and the leaching solution contains less than 25 grams of sodium chloride per liter of solution.

6. The method of claim 5 wherein the compacted potassium chloride particles are leached for from about 1 to about 18 hours with a leaching solution containing less than 15 grams of sodium chloride per liter of solution.

7. The method of claim 6 wherein leaching is conducted for at least 4 hours.

8. The method of claim 6 wherein the leaching solution contains from 0 to 10 grams of sodium chloride per liter of solution.

9. The method of claim 6 wherein the compacted potassium chloride crystals are leached for a time sufficient to reduce the sodium chloride content to from about 0.03 to about 0.3 weight percent.

10. A method of reducing the sodium chloride content of an industrially crystallized potassium chloride product having a potassium chloride content of at least 97.5 weight percent and containing from 0.5 to 2.5 weight percent sodium chloride, which comprises leaching under isothermal conditions compacted particles of a particle size from about 8 to 200 Tyler mesh of said potassium chloride product with an aqueous leaching solution, the solute of which solution is selected from the group consisting of potassium chloride and mixtures of potassium chloride and sodium chloride, said leaching solution being saturated with respect to potassium chloride and containing less than 45 grams sodium chloride per liter of solution, for from 0.5 to 18 hours at temperatures of between 20° C. and 70° C. and separating leached particulate potassium chloride product having a sodium chloride content of less than about 0.5 weight percent from the leaching solution.

11. The method of claim 10 wherein the leaching solution contains less than 25 grams of sodium chloride per liter of solution.

12. The method of claim 10 wherein the leaching solution contains less than 15 grams of sodium chloride per liter of solution.

13. The method of claims 10 or 12 wherein the leaching is conducted continuously in a column and the leaching solution moves countercurrently to the potassium chloride particles.

14. The method of claims 10 or 12 wherein the leaching is conducted in more than one stage.

15. The method of claim 14 wherein the leaching is conducted with a continuous belt filter.

16. A process for reducing the sodium chloride content of industrially crystallized potassium chloride, which comprises:
providing crystalline particles of said potassium chloride containing from about 0.5 to about 2.5 percent by weight of encapsulated sodium chloride;
compacting said crystalline particles to produce a compacted sheet;
crushing said sheet;
introducing particulate potassium chloride from the crushed sheet having a particle diameter less than about 10 Tyler mesh into a leaching vessel in admixture with a leaching solution containing a further quantity of said potassium chloride, said leaching solution being saturated with respect to potassium chloride and containing less than 45 grams of sodium chloride per liter of solution, to extract the encapsulated sodium chloride from said particulate potassium chloride to provide a potassium chloride product containing less than about 0.3 percent by weight of sodium chloride; and
separating said potassium chloride product from said leaching vessel and leaching solution.

17. The process of claim 16 wherein admixing of the leaching solution and particulate potassium chloride having a particle diameter less than about 10 Tyler mesh is defined further as:
admixing said leaching solution and said particulate potassium chloride having a particle diameter less than about 10 Tyler mesh in a ratio of from 300 to 4000 grams of particulate potassium chloride per liter of leaching solution.

18. The process of claim 16 wherein admixing of the leaching solution and particulate potassium chloride having a particle diameter less than about 10 Tyler mesh is defined further as:
admixing said leaching solution and said particulate potassium chloride having a particle diameter less than 10 Tyler mesh in a ratio of from 200 to about 700 grams of particulate potassium chloride per liter of leaching solution.

19. The process of claim 16 in which the leaching solution is defined further as a solution that is saturated with said potassium chloride and contains less than 25 grams of sodium chloride per liter of leaching solution.

20. The process of claim 16 wherein said leaching is defined further as being effected without substantial dissolution of the particulate potassium chloride present in said leaching vessel.

21. The process of claim 16 wherein said leaching is defined further as being effected at about 20° C.

22. A process for reducing the sodium chloride content of industrially crystallized potassium chloride, which comprises:
providing crystalline particles of potassium chloride containing from about 0.9 to about 2 percent by weight of incorporated sodium chloride;
compacting said crystalline particles to produce a compacted sheet;
crushing said sheet;
introducing particulate potassium chloride from the crushed sheet having a particle diameter less than about 10 Tyler mesh into a leaching vessel in admixture with a leaching solution containing a further quantity of potassium chloride, said leaching solution being saturated with respect to potassium chloride and containing less than 45 grams of sodium chloride per liter of solution, to extract the incorporated sodium chloride from said particulate potassium chloride to provide a potassium chloride product containing less than about 0.5 percent by weight of sodium chloride; and
separating said potassium chloride product from said leaching vessel and leaching solution.

* * * * *